May 20, 1952   N. J. WATSON   2,597,415
LOADING MECHANISM FOR COOKY COATING APPARATUS AND THE LIKE
Filed May 18, 1949   3 Sheets-Sheet 1
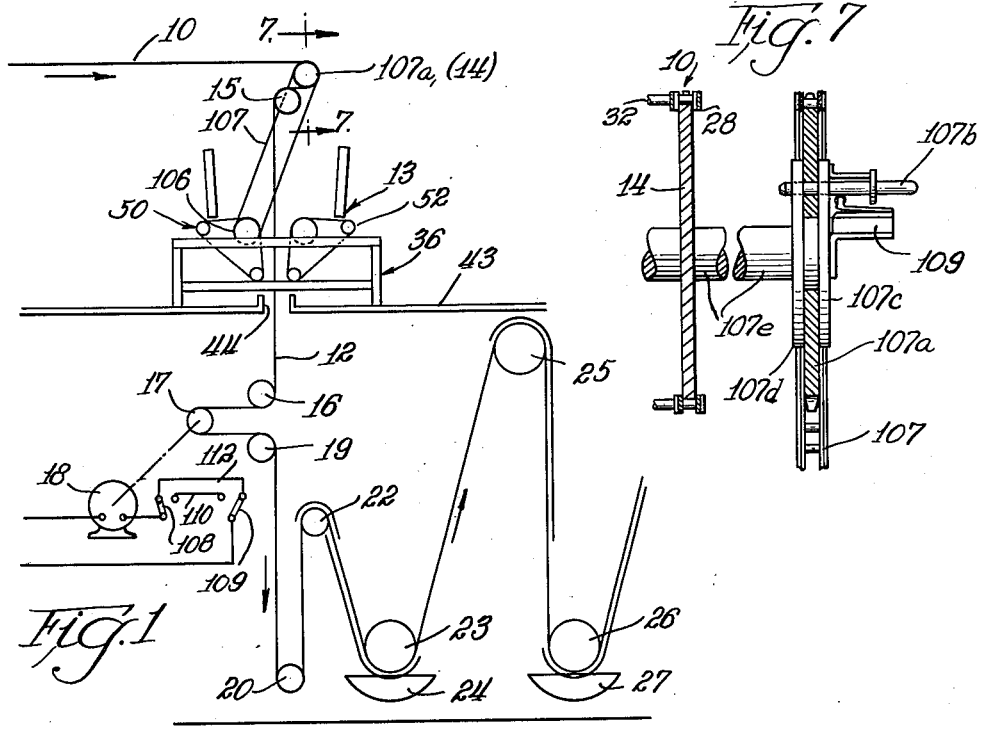
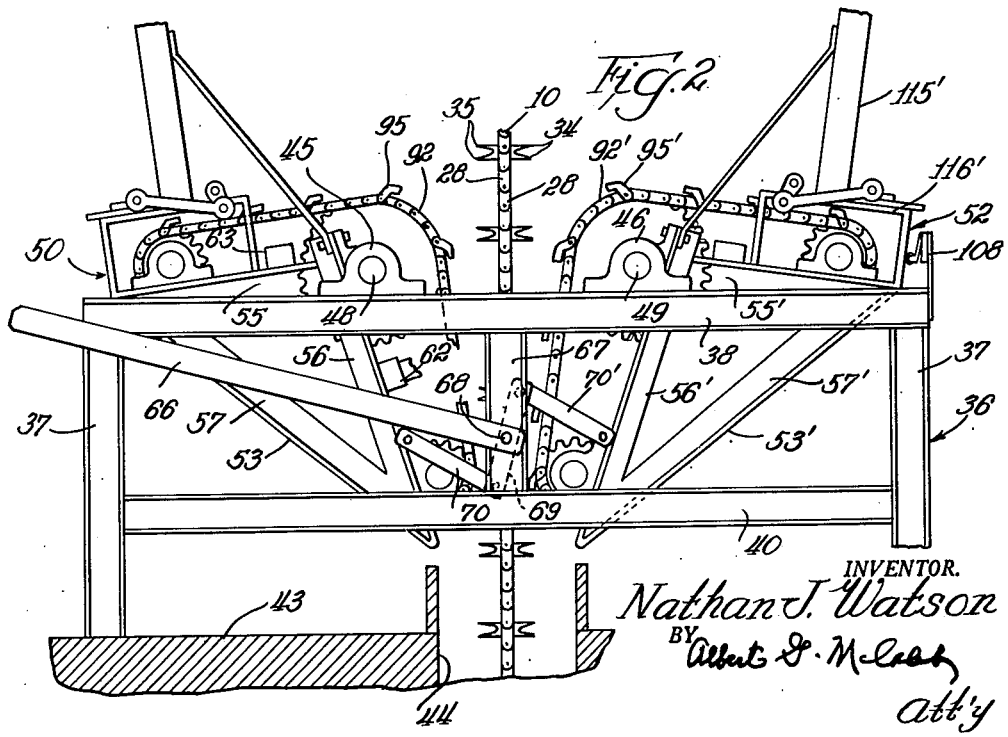
INVENTOR.
Nathan J. Watson

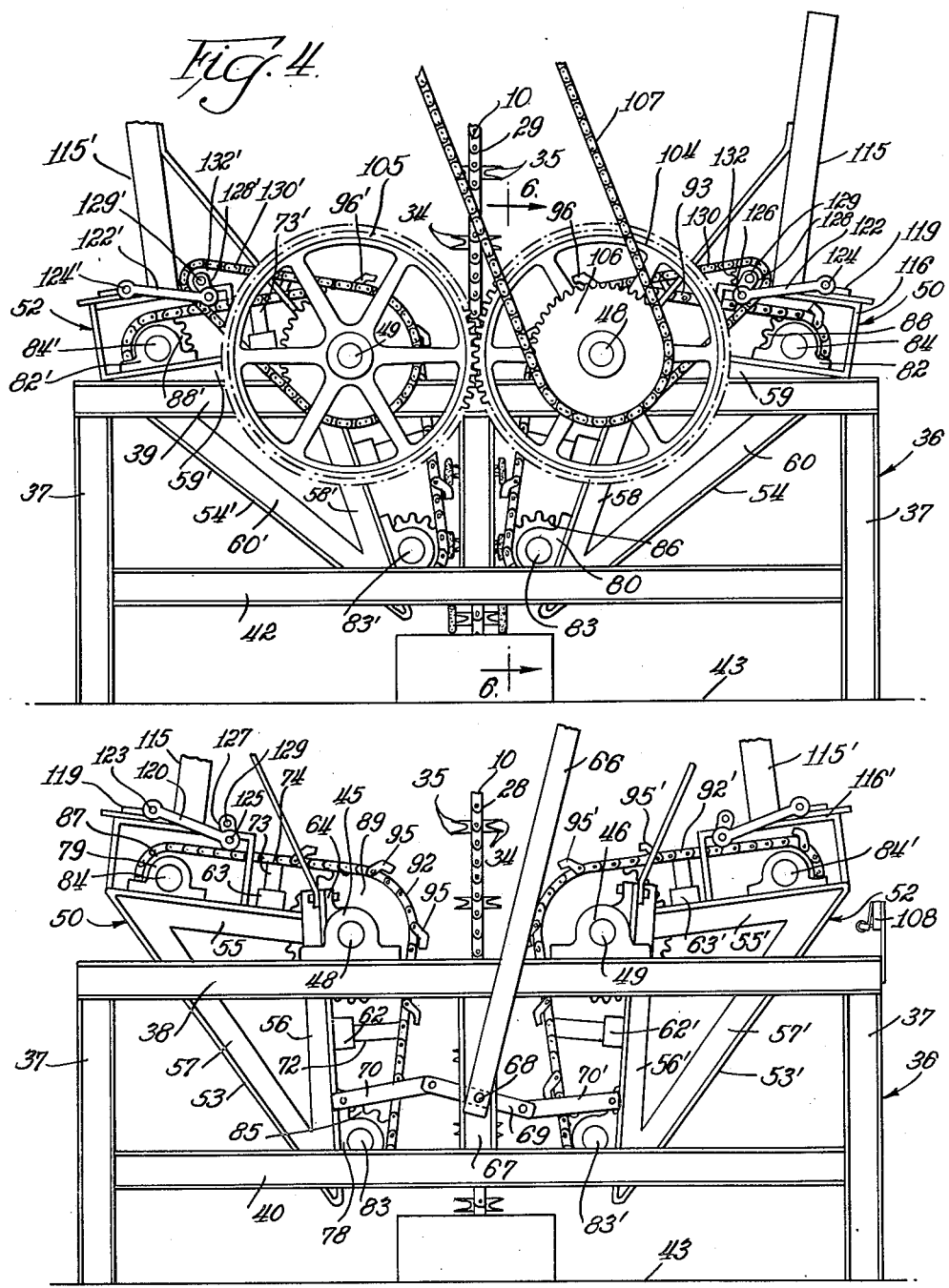

May 20, 1952 N. J. WATSON 2,597,415
LOADING MECHANISM FOR COOKY COATING APPARATUS AND THE LIKE
Filed May 18, 1949 3 Sheets-Sheet 3
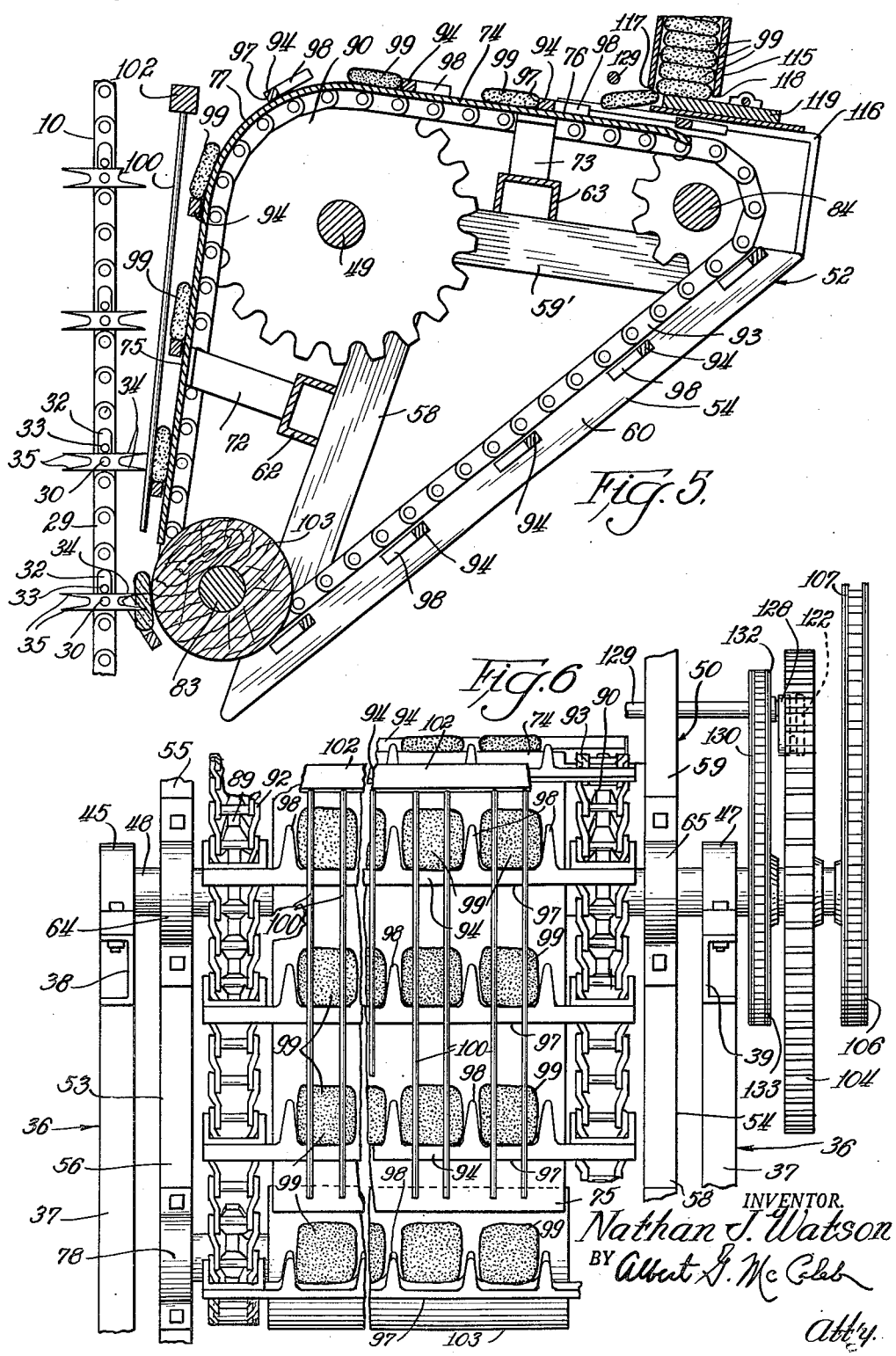

Patented May 20, 1952

2,597,415

UNITED STATES PATENT OFFICE

2,597,415

LOADING MECHANISM FOR COOKY COATING APPARATUS AND THE LIKE

Nathan J. Watson, Sioux City, Iowa, assignor to Johnson Biscuit Company, Sioux City, Iowa, a corporation of Iowa Application May 18, 1949, Serial No. 94,015

18 Claims. (Cl. 198—20)

This invention relates to a loading mechanism for cooky coating apparatus and the like, and more particularly to a loading mechanism adapted to use in applying confections, such as the base cakes of cookies, to trolley type dip-coating equipment.

The loading mechanism of this invention is related to, and usable in the place of that shown and described in the copending application, Serial No. 773,450, entitled Method and Apparatus for Dip-Coating Cookies and the Like, in which I am a coinventor with William R. Steingraber.

One of the objects of this invention is to provide an efficient and effective loading mechanism adapted to operation in synchronism with a continuously moving conveyor for simultaneously applying base cakes to opposite sides of the conveyor in a manner such that those base cakes will be firmly held by the conveyor during subsequent travel and operations.

As another object, my invention has within its purview the provision of a loading mechanism having parts normally driven in synchronism with a conveyor, and wherein means is provided for preventing the operation of the conveyor without the loading mechanism being synchronized therewith, unless the loading mechanism is moved to an inoperative position relative to the conveyor.

Another object of my invention is to provide a loading mechanism including a part for effecting transfer of base cakes from a hopper to a conveyor, which part is movable to and from operative relationship with respect to the conveyor, and wherein controls prevent the feeding of base cakes from the hopper to the part when the part is out of its operative position with respect to the conveyor.

My invention further comprehends the provision of a loading mechanism for impaling base cakes upon the tangs of a conveyor and wherein said mechanism is readily swingable to and from an operative position relative to the conveyor.

As another object, my invention includes within its purview the provision of a loading mechanism embodying parts normally operated in synchronism with and in predetermined phase relationship to a conveyor, and wherein the parts and their respective drives are constructed and arranged to permit close adjustment of the phase relationship, as well as to prevent the operation of the parts out of synchronism or phase after adjustment.

Other objects and advantages of the invention will be apparent from the following description and the accompanying drawings in which similar characters of reference indicate similar parts throughout the several views.

Referring to the three sheets of drawings,

Fig. 1 is a fragmentary diagrammatic view in side elevation which depicts the adaptation of a preferred embodiment of my invention to the loading of a conveyor with base cakes or the like in the production of coated cookies;

Fig. 2 is a fragmentary front elevational view of apparatus embodying a preferred form of my invention, and wherein the parts are shown in their normal operating positions;

Fig. 3 is a view similar to Fig. 2, but illustrating different positions of certain parts of the apparatus;

Fig. 4 is a rear end elevational view of the apparatus illustrated in Figs. 2 and 3, and viewed from the end opposite that shown in Figs. 2 and 3, with the parts in positions corresponding to those of Fig. 2;

Fig. 5 is a fragmentary end sectional view of a portion of the mechanism illustrated in Fig. 4, and drawn to a somewhat larger scale than that used in Fig. 4;

Fig. 6 is a fragmentary view, in elevation, and taken substantially at the position indicated by a line 6—6 in Fig. 4 and in a direction indicated by the accompanying arrows; and Fig. 7 is an enlarged fragmentary sectional detail of a portion of the structure illustrated in Fig. 1, and wherein the section is taken substantially at a position indicated by a line 7—7 in Fig. 1 and in the direction indicated by accompanying arrows.

Although the mechanism, to which this application is quite particularly directed, is mainly devoted to the purpose of loading base cakes or the like onto an endless conveyor for dip-coating and drying purposes, Fig. 1 diagrammatically illustrates a sufficient portion of the conveyor and associated apparatus to provide a general understanding of an exemplary environment and arrangement in which my loading mechanism is adapted to operation. As depicted in Fig. 1, an endless conveyor 10 has a substantially vertical portion 12 which passes adjacent a loading mechanism indicated generally by the reference numeral 13. Near the loading mechanism, the conveyor is carried by sprockets 14, 15 and 16. From the sprocket 16, the conveyor passes around a drive sprocket 17 which is drivingly connected to a prime mover 18, which prime mover, in the present instance, is an electric motor. From the drive sprocket 17, the conveyor is carried by sprockets 19, 20 and 22 which are so arranged and relatively disposed that the conveyor descends from the sprocket 22 to a sprocket 23 located adjacent a first dip pan 24, which dip pan carries coating material into which the base cakes or the like are first dipped. As will be more fully understood in connection with the more detailed disclosure of my preferred conveyor, it embodies base cake carrying tanks which project oppositely from the two sides of the conveyor. With this type of conveyor, the base cakes on one side thereof are dip-coated with the material in the dip pan 24, from which the conveyor extends upwardly to a sprocket 25 and then descends to a sprocket 26 adjacent a second dip pan 27. The second dip pan carries material for the dip-coating of the base cakes on the other side of the conveyor. From the second dip pan, the conveyor may pass through a circuitous path to accomplish the drying of the dip-coated layer. When desired, the circuit of the conveyor may include further dipping operations and appropriate drying space to accompany the additional dip-coating.

Referring in greater detail to the structure of my preferred conveyor and my improved loading mechanism, as illustrated in Figs. 2 to 7 inclusive, the conveyor 10 preferably includes a pair of chains 28 and 29 which travel over similar sprockets in substantially parallel relationship. Between these conveyor chains 28 and 29, a series of hook bars 30 (Fig. 5) is suspended for relatively free rotational movement by connecting links 32 which are rotatably carried by studs 33 extending inwardly from each of the chains. Each of the hook bars has secured thereto a series of spaced and oppositely projecting tangs 34 and 35, which tangs are aligned in rows longitudinally of the conveyor. With this structure and arrangement of the hook bars, those bars normally hang in positions relative to the conveyor chains such that the oppositely projecting tangs 34 and 35 extend horizontally.

The loading apparatus of this invention is adapted to effect the simultaneous loading of base cakes onto the oppositely projecting tangs 34 and 35 of the conveyor while that conveyor is in motion. In accomplishing this purpose, the disclosed loading mechanism firmly impales the base cakes upon the projecting tangs and avoids movement of the base cakes relative to the tangs which would tend to loosen the tangs in the relatively frail material of the base cakes, so that they will drop from the conveyor tangs before reaching an unloading position. The disclosed loading mechanism is further characterized by its ability to be retracted from the conveyor and stopped, so that when desired the conveyor may be operated independently of the loading mechanism.

In the disclosed embodiment of my invention, a main support frame 36 embodies corner posts 37 adjoined at the top by cross beams 38 and 39 and braced below the top cross beams by cross braces 40 and 42. In use, the main support frame is carried directly by a floor or platform 43 which has an opening 44 through which the conveyor 10 extends. The cross beam 38 has bearing blocks 45 and 46 secured thereto on opposite sides of the conveyor 10. In like manner and as depicted in Fig. 6, similarly spaced bearing blocks, such as 47, are secured to the cross beam 39. The aligned pairs of bearing blocks on the cross beams 38 and 39 rotatably support shafts 48 and 49, so that those shafts extend across opposite faces of the conveyor in spaced relationship thereto and in substantially parallel relationship to the general plane of the conveyor chains. The shafts 48 and 49 provide supports for opposed loading assemblies 50 and 52 for loading base cakes onto the tangs on opposite sides of the conveyor, which assemblies are movable about the axes of the shafts 48 and 49 to normal or loading and retracted positions respectively as shown in Figs. 2 and 3. In many respects, the structures of the loading assemblies 50 and 52 are alike although reversed, so that a description of one will suffice for both. Thus, except for the use of prime marks to designate the parts of one of the loading assemblies, similar reference numerals will be applied to the corresponding parts of the two assemblies.

Each of the movable loading assemblies 50 and 52 includes end frames 53 and 54, which end frames are preferably triangular in shape; the end frame 53 being made up of angle bars 55 and 56 secured together at adjacent ends in nearly right angular relationship and braced across their opposite ends by an angle bar 57, while the opposed and substantially aligned end frame 54 is similarly constructed of angle bars 58 and 59 with their ends secured together in opposed relationship by cross channels 62 and 63. Externally of the end frame 53 and at the juncture of the angle bars 55 and 56, a bearing block 64 is secured thereto. Likewise, and in aligned relationship to the bearing block 64, a bearing block 65 is secured to the end frame 54 at the juncture of the angle bars 58 and 59. The bearing blocks 64 and 65 provide aligned bearings through which the shaft 48 extends, whereby the frame of the loading assembly 50 is supported for swinging movement relative to the shaft 48.

As depicted in Figs. 2 and 3, a manually operable lever 66 is supported for swinging movement relative to a frame member 67 having its opposite ends secured to the cross beam 38 and cross brace 40 of the support frame 36; the connection between the lever 66 and frame member being provided by fastening means, such as a pin or bolt 68. A cross arm 69 is secured to the lever 66 adjacent the axis of the fastening means 68 and extends equally on opposite sides of the lever. The opposite ends of the cross arm 69 are movably connected to links 70 and 70', which links are also movably connected at their opposite ends to the end frames 53 and 53' of the loading assemblies 50 and 52 respectively. Since the links are connected to the end frames at positions below the axes of the shafts 48 and 49, swinging movement of the lever 66 and the resultant rotation of the cross arm 69 effects the inward and outward swinging movements of the frames relative to the conveyor 10, as illustrated in Figs. 2 and 3.

Brackets 72 and 73 project outwardly from the cross channels 62 and 63 respectively and have a formed plate 74 secured thereto, which formed plate has a lateral extent somewhat greater than the spacing of the outer end rows of tangs carried by the conveyor. The plate 74, as shown in Fig. 5, provides surface portions 75 and 76 in substantially right angular relationship to one another and connected by an intervening and integral curved portion 77 which is preferably arcuate and disposed in concentric relationship to the axis of the shaft 49. Additional bearing blocks 78, 79, 80 and 82 secured to the angle bars 56, 55, 58 and 59 respectively at positions near the ends of those angle bars which are displaced from the bearing blocks 64 and 65 provide supports for auxiliary conveyor shafts 83 and 84. The shafts 83 and 84, in my disclosed structure, are located near the opposite ends of the plate 74 and are substantially parallel to the shaft 49. The shaft 83 has sprockets 85 and 86 secured thereto at its opposite ends and internally of the end frames 53 and 54. Likewise, the shaft 84 has sprockets 87 and 88 secured thereto in aligned relationship to the sprockets 85 and 86. In addition, sprockets 89 and 90 are secured to the shaft 48 in alignment with the sprockets 85 and 86. Thus the sprockets 85, 87 and 89 at one end of each of the shafts 83, 84 and 48 respectively and the sprockets 86, 88 and 90 at the other ends of those shafts support auxiliary conveyor chains 92 and 93 in opposed and substantially parallel relationship at the opposite ends of the loading assemblies. These conveyor chains each follow a path of generally triangular shape. Also, the sizes of the sprockets 89 and 90 on the shaft 48 are selected so that the auxiliary conveyor chains follow the curvature of and lie closely adjacent the opposite edges of the curved portion 77 of the plate 74. In addition, the sprockets 85, 86, 87 and 88 are preferably of a diameter smaller than the diameter of the sprockets 89 and 90, but are mounted so that the portions of the auxiliary conveyor chains on opposite sides of the sprockets 89 and 90 extend along and closely adjacent the opposite edges of the substantially flat surface portion 75 and 76 of the plate 74.

Feeder bars have their opposite ends connected to the opposed auxiliary conveyor chains 92 and 93 by connecting links 95 and 96 respectively; those feeder bars being in spaced and substantially parallel relationship to one another and disposed for movement along and closely adjacent the flat and curved surface portions of the plate 74. As shown in Fig. 6, corresponding forward edges 97 of the feeder bars 94 are substantially straight, while the opposite edges thereof have integrally formed separators 98 projecting therefrom and lying along the surfaces of the plate 74; the spacing between the adjacent separators being such that base cakes 99 held therebetween are aligned with the rows of tangs on the conveyor 10. Also, the spacing between the feeder bars corresponds to that between the hook bars 30 of the conveyor 10, so that the tangs of the main conveyor are aligned with the mid-portions of the base cakes on the auxiliary conveyor.

As indicated in Figs. 2 and 5, the spacing of the shafts 48 and 49 from the conveyor 10 and the selected normal disposition of each loading assembly is such that the surface portion 75 of the plate 74 gradually approaches closer to the general plane of the chains of the conveyor 10 and the projecting ends of the tangs 34 and 35 on that conveyor in the direction of movement of the conveyor. That is, as indicated by arrows in Fig. 1, the conveyor 10 moves downwardly between the opposed loading assemblies 50 and 52 and the lower end of the surface portion 75 of the plate is closer to the plane of the conveyor chains than the upper portion of that plate; the spacing of each plate from the tangs of the conveyor being calculated to force the tanks into the mid-portion of each base cake as the base cakes and the conveyor move downwardly along the plates in timed and synchronized relationship to the movement of the conveyor and while the base cakes are backed by the respective plates. The spacing of each plate from the tangs is sufficient, however, that the tangs do not come in contact with the plates, so as to be damaged thereby. When the lower ends of the loading assemblies 50 and 52 are swung outwardly, as illustrated in Fig. 3, the spacing is such that the tangs of the conveyor pass freely between the loading assemblies with substantially space between the conveyor and loading assemblies. As shown in Figs. 5 and 6, long fingers 100, of wire or the like are supported by a cross bar 102 and extend downwardly between each of the loading assemblies and the conveyor, out of alignment with the rows of tangs but in alignment with the base cakes 99, to prevent the base cakes from falling away from the portion 75 of the plate before they are firmly impaled upon the tangs of the conveyor.

At the lower end of the plate 74 and mounted on the shaft 83 between the sprockets 85 and 86 is a roller 103 adapted to be driven by the shaft 83. This roller is made of a relatively soft material, such as wood, and in addition to being longitudinally coextensive with the plate 74, is of a diameter such that it is flush with or extends slightly beyond the surface plane of the portion 75 of the plate, so as to give the base cakes a final application of pressure to force them onto the tangs. The material of the roller being relatively soft, the likelihood of any damage to the sharp ends of the tangs as a result of this final application of pressure to the base cake is avoided. As a further incident to the disclosed structure, as depicted in Fig. 5, it may be noted that by utilizing sprockets on the shaft 83 which are of relatively small diameter, the feeder bars of the auxiliary conveyor depart quite abruptly from the base cakes after they are finally impaled upon the tangs. This avoids any dragging of the lower edges of the base cakes against the edges of the feeder bars during their separation in a manner which would tend to move and loosen the base cakes relative to the tangs.

For the purpose of effecting operation of the loading assemblies 50 and 52 in timed and synchronized relationship to one another, I have provided meshing gears 104 and 105 of like size on adjacent ends of the shafts 48 and 49. Since a 1:1 ratio is provided by this gear connection the two auxiliary conveyors will operate at the same speed. Also, each is timed relative to the other by the initial setting of the gears 104 and 105 upon their respective shafts. The driving of the two auxiliary conveyors in timed relationship to the conveyor is effected, as illustrated in Figs. 1, 4, and 7, by a sprocket 106 which is connected with the sprocket 14 of the conveyor through a drive chain 107, a sprocket 107a, a pin 107b, flange members 107c and 107d, and a shaft 107e. The pin 107b is inserted through the sprocket 107a and the flange members to secure them together for joint rotation. The flange members and the shaft 107e are secured to rotate with one another. In my preferred structure, the sprockets 89, 90, 106 and 14 are of the same diameter, and the chains of the conveyor 10 and auxiliary conveyors are alike, so that the spacing of the feeder bars corresponds to the spacing of the hook bars and the linear speeds of the main and auxiliary conveyors are substantially the same.

As a safety precaution for preventing the operation of the conveyor independently of the auxiliary conveyors without having the auxiliary conveyors retracted, as shown in Fig. 3, as well as to prevent the operation of the auxiliary conveyors while they are retracted, and to insure the proper timing of the main and auxiliary conveyors when they are started, I have provided cooperating electrical controls, one of which is actuated by movements of the loading assemblies between their normal and retracted positions and the other of which is actuated by the provision or breaking of the driving connection between the main and auxiliary conveyors. As depicted in a simplified wiring diagram which comprises a portion of Fig. 1, control switches 108 and 109 are connected in the power supply circuit to the main drive motor 18. Actually, the switches in the power supply circuit would normally be electromagnetically actuated circuit breakers, and such circuit breakers would be remotely controlled by switches at the control positions. Each of the illustrated switches 108 and 109 is a single pole, double throw switch; the contacts of those switches being separately connected together by leads 110 and 112, so that a power supply circuit to the motor 18 is completed by either of two predetermined relationships of the two switches, while the change of the position of either switch breaks the power supply circuit to the motor. As depicted in Figs. 2 and 3, the switch 108 is mounted for actuation by movement of the loading assembly 52. As shown in Fig. 7, the switch 109 is mounted on the flange member 107c and is actuated by the pin 107b which provides the driving connection between the sprocket 107a and the flange members 107c and 107d, and thus between the sprocket 107a and the sprocket 14 of the conveyor 10. With this disclosed structural arrangement, the switch 109 is actuated by the retraction or the installation of the drive pin 113 so as stop or start the operation of the loading assemblies in relation to the main conveyor. The switches are so connected that one power circuit to the main driving motor is closed through the two switches when the loading assemblies are in their normal positions, as shown in Figs. 2 and 4. Thus, the stopping of either the loading assemblies or the retraction of the loading assemblies, as shown in Fig. 3, will effect stoppage of the main conveyor. To restart the main conveyor after retraction of the loading assemblies, the driving connection to the loading assemblies must be broken. Also, there being only one position for the insertion of the driving pin 113, the loading assemblies cannot be started to operate with the main conveyor unless they are in their proper timed relationship.

For feeding the base cakes onto the upper and relatively horizontal surface portion 76 of the plate 74 between the successive feeder bars 94 of the auxiliary conveyor, I have provided a series of hoppers 115 at positions spaced from the main conveyor and which are supported above the auxiliary conveyor assembly by a support platform 116 carried on the auxiliary conveyor end frames 53 and 54. The hoppers of the series are in a row extending across the auxiliary conveyor with their spacing substantially corresponding to that of the spaces between the separators 98 on the feeder bars and the spacing of the tangs on the main conveyor. Also, the hoppers are upright in normal disposition and are each of a size that base cakes 99 gravitate therethrough.

As shown in Fig. 5, the lower ends of the hoppers 115 are elevated above the top of the platform 116, so as to leave slots 117 and 118 in opposed relationship; the slot 117 providing passages for the ejection of base cakes from the hoppers and the opposed slot 118 being provided for the passage of a slide 119 into and from the space at the bottom of the hopper. From the slot 117, the base cakes fall from the end of the platform 116 onto the end of the surface portion 76 of the plate 74. By passing into the slot 118, the slide 119 ejects the lower base cake from each of the hoppers and upholds the remaining base cakes in each of the hoppers. When retracted, the slide moves from beneath the base cakes in the hoppers and allows those base cakes to gravitate, so that another is between the end of the slide and the slot 117. In the disclosed structure, the slide 110 is operated in synchronism and timed relationship to the movements of the feeder bars of the auxiliary conveyor, so that base cakes fall between the successive feeder bars of the auxiliary conveyor during the continued movement of those feeder bars.

In order to effect the desired linear movement of the slide 119 in timed relationship and synchronism with respect to the movements of the feeder bars, I have provided crank arms 120 and 122 at opposite ends of the side, which crank arms are movably connected to the slide by studs 123 and 124. Also, the crank arms are movably connected to studs 125 and 126 on cranks 127 and 128, which cranks are drivingly secured to opposite ends of a shaft 129. The cranks being aligned at the opposite ends of the shaft 129, rotational movement of the shaft effects linear reciprocating movement of the slide, with the slide stroke being dependent upon the length of the cranks. In my disclosed structure, the shaft 129 is driven in synchronism and timed relationship to the auxiliary conveyor by a drive chain 130 which forms a driving connection between a sprocket 132 and the shaft 129 and a sprocket 133 on the shaft 48. The ratio of the diameters of the sprockets 133 and 132 is such that a complete cycle of movement of the slide 119 is effected during the progress of the auxiliary conveyor a distance equal to the spacing between successive feeder bars. Also, the selected timing of the slide movements is predetermined to effect the deposit of base cakes upon the plate 74 between the successive feeder bars.

From the foregoing description and reference to the accompanying drawings, it may be readily understood that base cakes manually or otherwise fed into the hoppers 115 will gravitate therethrough and be ejected singly from each hopper by the slide 119, so as to fall onto the relatively horizontal surface portion 76 of the plate 75 at a distance from the conveyor 10. On the top surface portion 76 of the plate 74, the base cakes are pushed along the plate toward the conveyor by the forward edges 97 of the feeder bars. However, when the curved portion 77 of the plate is reached, the base cakes gravitate into the pockets between the separators 98 on the next preceding feeder bar and follow that feeder bar downwardly and toward the conveyor tangs while backed by the surface portion 75 of the plate and prevented from falling by the elongated fingers 100. Base cakes are simultaneously forced into the oppositely projecting tangs while disposed against the portion 75 of the plate. Then, after leaving the plate, the roller 103 finally urges the base cakes onto the tangs, so that those base cakes are firmly held by the conveyor. When thus firmly secured to the conveyor, the feeder bars of the auxiliary conveyor are retracted from beneath the base cakes without tendency to loosen the base cakes on the tangs.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In combination with a conveyor for dip-coating base cakes and including substantially parallel side chains carrying hook bars in spaced and substantially parallel relationship, said hook bars having rows of spaced tangs normally projecting therefrom in a direction lateral to the plane of the side chains, and said side chains extending in a vertical direction at a loading position, a loading mechanism including a main support frame adjacent the conveyor at the loading position, a shaft supported by the main frame at a position spaced from and substantially parallel to the plane of the conveyor side chains, an auxiliary frame supported by the shaft for swinging movement about the axis of the shaft and having normal and retracted positions relative to the conveyor, said auxiliary frame carrying a plate having an arcuate mid-portion in substantially concentric relationship to the axis of said shaft and adjoining the plane portions, one of which plane portions extends angularly away from the conveyor and the other of which plane portions approaches into close proximity to the conveyor at a position spaced from the arcuate portion when the auxiliary frame is in the normal position, an auxiliary conveyor including sprockets on said shaft carrying chains adjacent the ends of the auxiliary frame and feeder bars carried by the chains in spaced relationship for movement along the exposed plane and arcuate portions of said plate, means for driving the auxiliary conveyor so that the feeder bars move in timed relationship to the hook bars, and means for feeding base cakes onto said plate at positions aligned with the tangs on the hook bars, said feeder bars of the auxiliary conveyor serving to move and guide the base cakes over the plate to positions such that the tangs are pressed into the base cakes as said base cakes are backed by the plate.

2. In a combination as defined in claim 1, said means for feeding base cakes onto the plate including hoppers through which the base cakes gravitate, a pusher plate movable across the bottoms of the hoppers for pushing one base cake at a time from each hopper onto the plate between the feeder bars, and means for driving the pusher bar in synchronism with the auxiliary conveyor.

3. In a combination as defined in claim 1, a roller of relatively soft material supported for rotation relative to the auxiliary frame at a position adjacent one end of said plate and close to conveyor when the auxiliary conveyor is in the normal position to finally press the base cakes onto the tangs without damage to the tangs.

4. In a combination as defined in claim 1, a manually operable lever supported for movement relative to the main support frame and having links connected thereto for moving the auxiliary frame between the normal and retracted positions, and control means for effecting stoppage of the conveyor when the auxiliary frame is moved to the retracted position.

5. In a combination as defined in claim 1, control means for effecting stoppage of the conveyor when the auxiliary support frame is moved from the normal to the retracted position, and control means effecting the restarting and operation of the conveyor when the means for driving the auxiliary conveyor is disconnected.

6. In a combination as defined in claim 1, control means for preventing operation of the conveyor independently of the auxiliary conveyor unless the auxiliary frame is in the retracted position.

7. In combination with a main conveyor for dip-coating base cakes and including chains carrying hook bars in spaced relationship and having tangs projecting therefrom at positions to form rows, a loading mechanism including hoppers through which the base cakes gravitate, a plate formed to provide a guiding and backing surface along which the base cakes are moved from the hoppers to the main conveyor, means driven in synchronism with the main conveyor for effecting the movements of base cakes, one at a time, from each of the hoppers to the plate, a portion of said plate presenting a surface spaced from the hoppers and having a gradual approach into close proximity to the projecting tangs on the main conveyor, and an auxiliary conveyor including feeder bars supported for movement from the hoppers to the main conveyor along and adjacent the surface of said plate, means for driving the auxiliary conveyor so that the feeder bars are moved in timed relationship to the movements of hook bars of the main conveyor, whereby the base cakes are forced onto the tangs while being moved by the auxiliary conveyor along the aforesaid portion of the plate.

8. In a combination as defined in claim 7, said feeder bars having spacers thereon for separating the base cakes to coincide with the spacing of the tangs on the hook bars.

9. In a combination as defined in claim 7, a roller supported for rotation adjacent the end of the plate remote from the hoppers and close to the main conveyor for engaging the base cakes to impart a final force thereto for urging them onto the tangs.

10. In a combination as defined in claim 7, a roller supported for rotation adjacent the end of the plate remote from the hoppers and close to the main conveyor for engaging the base cakes to impart a final force thereto for urging them onto the tangs, and said auxiliary conveyor turning away from the main conveyor at the roller so that the feeder bars swing from the path of the base cakes on the main conveyor.

11. In combination with a main conveyor for dip-coating base cakes and including chains carrying hook bars in spaced relationship and having tangs projecting therefrom at positions to form rows, a loading mechanism including means providing a guiding and backing surface along which base cakes are moved to the main conveyor, a portion of said surface having a gradual approach to the main conveyor in the direction of normal movement of the main conveyor and terminating in close proximity to the tangs on the hook bars of the main conveyor, an auxiliary conveyor including feeder bars extending across the surface in a direction lateral to the direction of the main conveyor movement and supported for movement toward the main conveyor adjacent said surface, means including a drive mechanism interlocked to the main conveyor for driving the auxiliary conveyor and insuring that the feeder bars are moved in timed relationship to the movements of the hook bars of the main conveyor, and means for feeding base cakes onto said surface between the feeder bars.

12. In combination with a main conveyor for dip-coating base cakes and including hook bars in spaced relationship and having tangs projecting in opposed directions, a loading mechanism including similar and oppositely disposed loading assemblies on opposite sides of the conveyor and supported for swinging movement about an axis between loading and retracted positions, said assemblies each including normally stationary surfaces gradually approaching the tangs on opposite sides of the conveyor from positions near said axes and in a direction corresponding to the direction of normal conveyor movement, and means actuated in timed relationship to the movements of the hook bars on the conveyor for effecting controlled movement of base cakes along the surfaces simultaneously to be pressed onto the opposed tangs by said surfaces during movement.

13. In a combination as defined in claim 12, said means for effecting controlled movements of the base cakes including an auxiliary conveyor embodying feeder bars extending across said surfaces and having spacers thereon for aligning the base cakes with the tangs.

14. In a loading mechanism for applying base cakes and the like to projecting tangs on a vertical portion of a conveyor and comprising, in combination, a frame, means secured to said frame and presenting a surface having substantially flat portions in practically right angular relationship to one another and joined by a smoothly curved convex portion, one of said flat portions normally having a substantially horizontal disposition and the other being displaced from the vertical by a small angle such that it gradually approaches a vertical line in a direction extending away from the curved portion, an auxiliary conveyor including shafts supported by said frame, and feeder bars extending across said surface in spaced relationship and movable from the horizontal to the vertical portions in adjacent relationship thereto, and means for feeding base cakes onto the horizontal surface portion between the feeder bars to be moved by said bars to the vertical surface portion, said base cakes, upon leaving the horizontal surface portion, gravitating along the vertical surface portion to positions against the preceding feeder bars.

15. In a loading mechanism as defined in claim 14, said feeder bars having projections thereon forming pockets for spacing the base cakes as they move down the vertical surface portion.

16. In a loading mechanism as defined in claim 14, said means for feeding base cakes onto the horizontal surface portion comprising hoppers through which base cakes gravitate, and a pusher plate actuated in synchronism to the auxiliary conveyor for moving the base cakes from the hoppers onto the horizontal surface portion.

17. In a loading mechanism as defined in claim 14, one of said shafts being supported for rotation relative to said frame at a position adjacent the lower end of the vertical surface portion, and a roller mounted on said one of the shafts with its surface disposed to engage the base cakes as they leave the lower end of the vertical surface portion.

18. In a loading mechanism as defined in claim 14, a main support, one of said shafts being supported for rotational movement by the main support and extending in substantially parallel relationship to the interior of the curved portion of said surface, and said frame being supported for limited swinging movement relative to said one of the shafts.

NATHAN J. WATSON.

REFERENCES CITED

The following references are of record in the file of this patent:

UNITED STATES PATENTS

| Number | Name | Date |
| --- | --- | --- |
| 594,152 | Goodwin | Nov. 23, 1897 |
| 1,226,910 | Reed et al. | May 22, 1917 |
| 1,920,563 | Johne | Aug. 1, 1933 |
| 2,217,020 | Jurgens et al. | Oct. 8, 1940 |
| 2,381,502 | Lang | Aug. 7, 1945 |